S. B. RATHBUN.
Rotary Churn-Dasher.
No. 201,287.    Patented March 12, 1878.
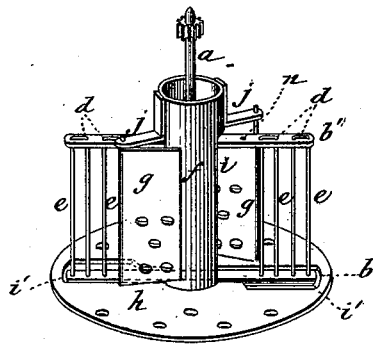
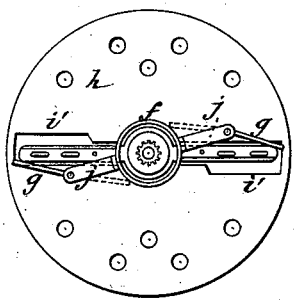
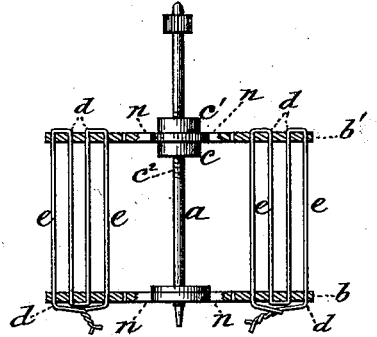

UNITED STATES PATENT OFFICE.

STEPHEN B. RATHBUN, OF DUNDEE, MICHIGAN.

IMPROVEMENT IN ROTARY CHURN-DASHERS.

Specification forming part of Letters Patent No. 201,287, dated March 12, 1878; application filed March 4, 1878.

*To all whom it may concern:*

Be it known that I, STEPHEN B. RATHBUN, of Dundee, in the county of Monroe and State of Michigan, have invented certain new and useful Improvements in Churn-Dashers; and I do hereby declare that the following is a full, clear, and exact description thereof, which will enable others skilled in the art to which it appertains to make and use the same, reference being had to the accompanying drawings, and to letters of reference marked thereon, which form a part of this specification.

My improvements in the churn are designed with the special object of producing a better quality of butter, and of obtaining the largest possible yield from the cream.

I use a vertically-revolving agitator, consisting of wires strung vertically between horizontal bars secured upon a vertical shaft, in such manner that one of said arms can be adjusted upon said shaft to draw the wires taut, and to keep them so. These wires are arranged in the bars on each side of the shaft, each series of wires being, preferably, composed of a single wire passed continuously through holes in the bars, and united at their ends by being twisted together at one of said bars.

A tube having a perforated disk at its lower end is removably arranged over said shaft, supported upon the upper bar of the agitator, and provided with a vertically-hinged and perforated wing on each side of said tube, in such manner as to fold back upon said tube during the operation of churning, for the purpose of throwing the cream constantly before the wings, and forming thereby an air-space within the tube, which is a little larger in diameter than the shaft, and carried by its upper bar for this purpose. The central air-space thus formed by the wings is of the greatest advantage in making good, pure, hard butter.

In reversing the motion of the agitator, the vertically-hinged wings will open against the wires to gather the butter. The perforated disk and its tube are made removable from the agitator, and by lifting them up over the bars to remove the butter, the perforated disk allows the milk to strain through it. The fine wires strung vertically between the bars act to break and not to cut the globules or sacks of butter in the cream, and leave the butter in solid, hard lumps, because the wires do not produce much friction in passing through the cream.

Referring to the drawings, Figure 1 represents my improved churning-agitator, with central tube and bottom disk combined therewith; Fig. 2, a top view of the same; and Fig. 3, a side view, showing the continuous wires of the agitator.

The shaft $a$ is stepped, as usual, in the churn-tub, and carries two horizontal bars, $b$ $b'$, the lower one of which is fitted over the angular shouldered end of said shaft, and the upper one, $b'$, is secured in position by two nuts, $c$ $c^1$, upon a screw-threaded portion, $c^2$, of said shaft, for a purpose to be presently stated. Through holes $d$ in these bars, on each side of the shaft, I pass vertically a continuous wire, $e$, such as is used in making brooms, and unite the ends by twisting them together upon one of said bars, and draw them taut by adjusting the upper bar by screwing up the under nut $c$ against said upper bar, and clamping it upon said nut $c$ by the upper nut. By this construction the wires are always kept at a proper tension, as, the lower bar being drawn by the wires against the shoulder of the shaft, any upward adjustment of the upper bar will tighten the wires. They can also be readily removed and replaced when broken, or when removal is found to be necessary from other cause. I combine with this vertically wire-strung agitator a tube, $f$, placed over its shaft, and carrying on each side vertically-hinged perforated wings $g$ and a bottom-perforated disk, $h$, on a plane with the lower bar.

The tube has vertical side slots $i$, and the disk has radial coincident slots $i'$, to allow said tube and disk to be placed over the bars, and to rest upon the upper one, so as to bring the lower bar within the disk-slots $i'$, and allow said tube and disk to be removed by lifting them over said shaft and bars, for a purpose to be presently stated.

The perforated wings are hinged to arms $j$ of the tube and to the disk, in positions to lie back against the tube while churning, as shown in Fig. 1, and cause the cream to be thrown against the vertical wires, and by this action to form an air-chamber in the space between the shaft and the inner walls of said tube, the central displacement of the cream by the wings producing this effect and the best results upon the butter. In reversing the motion of the agitator these wings will open and lie over the wires and gather the butter, while the perforated disk serves to lift the butter out of the tub, and to strain the milk from it.

The upper wire stretching and holding crossbar does not screw upon the shaft, but is clamped thereon by the nuts. The lower bar is beveled on its opposite edges, to lift the cream from the bottom up through the disk.

The shaft is driven by any suitable gearing, and the central tube, when used, rises to the bottom of the tub-cover.

Revolving knives have been used to cut the globules or cream-sacks; but these also cut the grain of the butter, and make it soft and sticky, and the friction of the knife-blades has the effect of making the butter white. The fine wires do not cut the grain of the butter, but leave it hard and with a fine yellow color.

I have stated that the action of the wings is to throw the cream against the wires, and to form thereby an air-chamber within the central tube. This result is produced by the centrifugal action of the wings, which, throwing the cream from the center, also draws the air down through the shaft-hole in the tub-cover, and drives it out in the cream through the side slots $i$ in said tube.

I am aware that wires have been fixed between cross-bars to form an agitator; but such wires have not been continuously strung through such bars, with means for drawing them taut and keeping them at the required tension.

I claim—

1. A churn-agitator consisting of the shouldered and screw-threaded shaft $a\ c^2$, the cross-bars $b\ b'$, the wires $e$, strung between them and secured as stated, and the adjusting and clamping nuts $c\ c^1$, for the purpose stated.

2. The combination, with the wire-strung agitator herein described, of the central tube $f$ and its vertically-hinged and perforated wings $g$, adapted for operation and to form the central air-chamber, for the purpose stated.

In testimony that I claim the foregoing I have affixed my signature in the presence of two witnesses.

STEPHEN B. RATHBUN.

Witnesses:
A. E. H. JOHNSON,
J. W. HAMILTON JOHNSON.